United States Patent
Sebald et al.

(10) Patent No.: US 10,008,855 B2
(45) Date of Patent: Jun. 26, 2018

(54) METHOD FOR WIRELESS ENERGY TRANSMISSION IN CLOSED SPACES

(71) Applicant: Airbus DS GmbH, Taufkirchen (DE)

(72) Inventors: Johannes Sebald, Bremen (DE); Hendra Kesuma, Bremen (DE)

(73) Assignee: Airbus DS GmbH, Taufkirchen (GB)

( * ) Notice: Subject to any disclaimer, the term of this patent is extended or adjusted under 35 U.S.C. 154(b) by 266 days.

(21) Appl. No.: 14/438,037

(22) PCT Filed: Oct. 22, 2013

(86) PCT No.: PCT/DE2013/000641
§ 371 (c)(1),
(2) Date: Aug. 11, 2015

(87) PCT Pub. No.: WO2014/063680
PCT Pub. Date: May 1, 2014

(65) Prior Publication Data
US 2015/0333521 A1    Nov. 19, 2015

(30) Foreign Application Priority Data

Oct. 23, 2012   (DE) .................. 10 2012 021 585

(51) Int. Cl.
*H02S 40/22* (2014.01)
*H02J 50/40* (2016.01)
(Continued)

(52) U.S. Cl.
CPC ............. *H02J 3/383* (2013.01); *H02J 5/005* (2013.01); *H02J 17/00* (2013.01); *H02J 50/30* (2016.02);
(Continued)

(58) Field of Classification Search
None
See application file for complete search history.

(56) References Cited

U.S. PATENT DOCUMENTS

| 4,419,532 A | 12/1983 | Severns |
| 4,746,370 A * | 5/1988 | Woolf .................. H02S 10/30 |
| | | 136/246 |

(Continued)

FOREIGN PATENT DOCUMENTS

| DE | 10037254 | 2/2002 |
| DE | 10233005 | 9/2004 |

(Continued)

OTHER PUBLICATIONS

International Search Report, dated Mar. 18, 2014.
(Continued)

*Primary Examiner* — Rexford Barnie
*Assistant Examiner* — Swarna N Chowdhuri
(74) *Attorney, Agent, or Firm* — Greer, Burns & Crain, Ltd.

(57) ABSTRACT

A method and device for the wireless transmission, in closed spaces, of energy emitted by at least one light source. The energy emitted by the light source is received by at least one solar cell module in the closed space and is converted into electricity. The method includes the steps of reflecting at least a part of the light energy emitted by the light source at a reflective surface inside the space, receiving the reflected light energy in the at least one solar cell module, and converting the reflected light energy into electricity. The device includes at least one solar cell module inside the closed space, configured to receive the light energy and convert the light energy into electricity. At least a portion of the space comprises a reflective inner surface comprising a multilayer insulation surface, at which the energy emitted by at least one light source is reflected.

5 Claims, 1 Drawing Sheet

(51) Int. Cl.
*H02J 3/38* (2006.01)
*H02J 5/00* (2016.01)
*H02J 17/00* (2006.01)
*H02J 50/30* (2016.01)

(52) U.S. Cl.
CPC .............. *H02J 50/40* (2016.02); *H02S 40/22* (2014.12); *Y02E 10/52* (2013.01)

(56) References Cited

U.S. PATENT DOCUMENTS

| | | | |
|---|---|---|---|
| 5,714,012 | A | 2/1998 | Murata et al. |
| 2006/0119850 | A1 | 6/2006 | Ucan |
| 2006/0223486 | A1* | 10/2006 | Ruff ........................ H04M 1/24 455/343.1 |
| 2009/0103925 | A1 | 4/2009 | Alpert |
| 2010/0031952 | A1* | 2/2010 | Zavodny ................... F24J 2/07 126/573 |
| 2011/0247680 | A1 | 10/2011 | Lifka et al. |
| 2011/0265840 | A1* | 11/2011 | Sela .......................... G01J 1/18 136/244 |
| 2013/0112275 | A1* | 5/2013 | Hekmatshoar-Tabari ............... H01L 31/03044 136/261 |

FOREIGN PATENT DOCUMENTS

| | | | |
|---|---|---|---|
| DE | 102009055684 | 5/2011 | |
| WO | 2010070607 | 6/2010 | |
| WO | WO 2010070607 A2 * | 6/2010 | .......... H01L 31/055 |

OTHER PUBLICATIONS

"Wireless Power Transmission for Solar Power Satellite (SPS)" N. Shinohara.
"Wireless Power Transmission for Solar Power Satellite (SPS)", N. Shinohara.

* cited by examiner

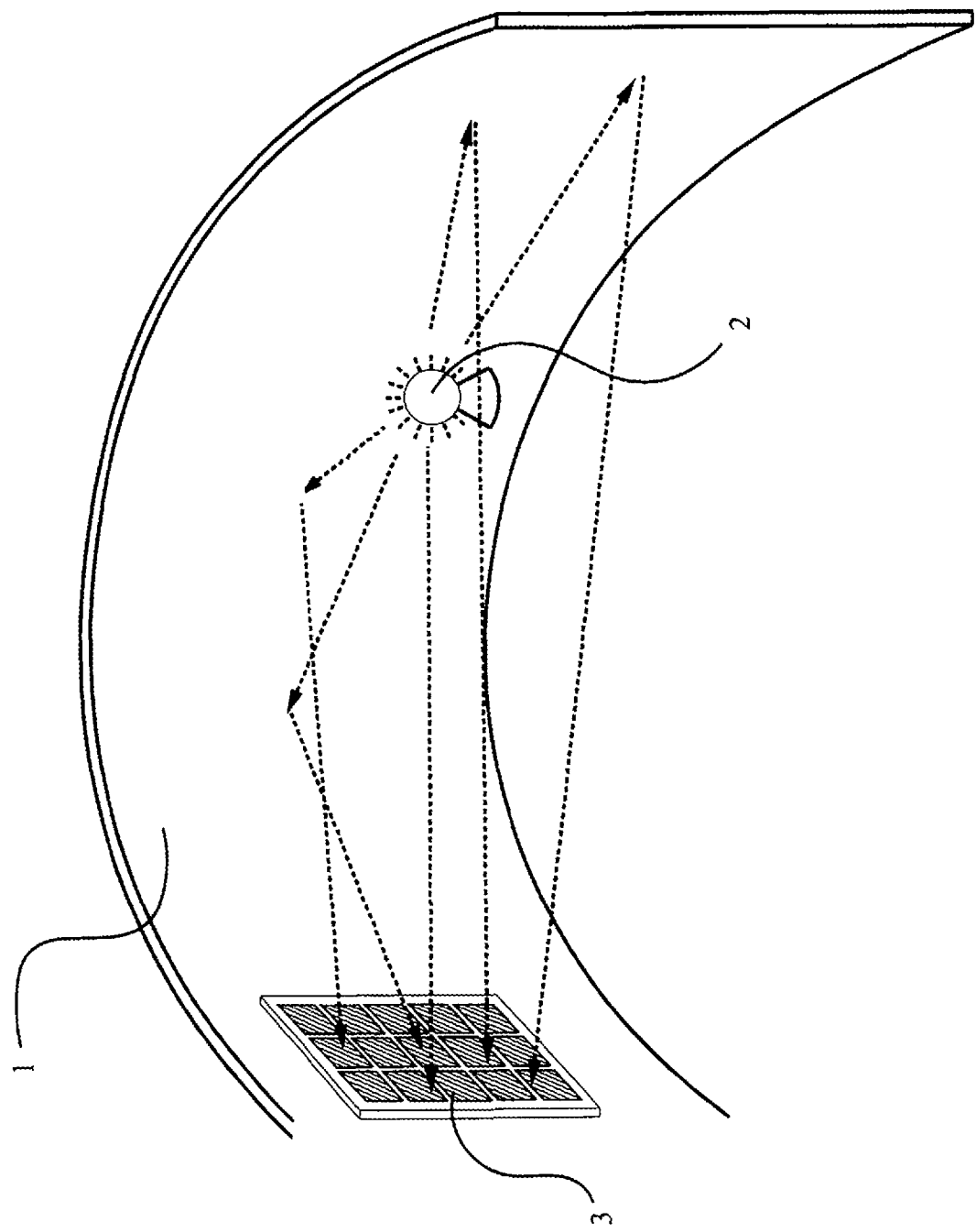

METHOD FOR WIRELESS ENERGY TRANSMISSION IN CLOSED SPACES

CROSS-REFERENCES TO RELATED APPLICATIONS

This application claims the benefit of the German patent application No. 10 2012 021 585.1 filed on Oct. 23, 2012, the entire disclosures of which are incorporated herein by way of reference.

BACKGROUND OF THE INVENTION

The invention relates to a method for the wireless transmission, in closed spaces, of the energy emitted by at least one light source, in which the light energy emitted by the light source is received by at least one solar cell module arranged in the closed space and is converted into electricity. It also relates to a device for carrying out this method.

The term "wireless energy transmission" in this case is defined quite generally as the transmission of electrical energy from an energy source to an electrical load without an electrically conducting physical connection. The most common form in which such a wireless energy transmission is carried out is by means of induction, wherein this is typically realized by resonant magnetic induction. Other methods make use of the transmission of electromagnetic radiation in the form of microwaves or laser light. Recent developments on this topic can be found on the internet, for example under the link "http://zomobo.net/Power-beaming".

A method of the above type, in which the light energy emitted in an enclosed space by a light source is received directly by a solar cell module and converted into electricity, has been disclosed in US Patent 2009/010 3 925 A1. In addition, DE 10 2009 055 684 A1 discloses a system for increasing the yield of photovoltaic systems for feeding energy into an AC voltage network, for supporting a heating system and providing hot water, in which the photovoltaic system is operated by the supply of artificial light. DE 102 33 005 B4 further discloses a similar arrangement, in which a device for supplying electricity to a sensor at a high electrical potential in a painting system comprises an artificial light source and PV modules. Finally, from DE 100 37 254 A1 an energy storage device is known which consists of an evacuated storage vessel that has a highly reflective coating over its entire internal surface and is connected via air-locks to one other vessel at each of its input and output ports. The input receptacle in this known arrangement is also reflectively coated, while the output vessel is completely lined with solar cells fitted with ports extending to the outside for supplying the electricity.

While the above methods and arrangements are all intended for terrestrial purposes and are designed accordingly, the article "Wireless Power Transmission for Solar Power Satellite (SPS)", for example, by N Shinohara, in www.sspi.gatech.edu/wptshinohara.pdf, describes a method for the wireless transmission of the energy emitted by at least one light source, which, in particular, can be used in space missions. In these applications the weight of the cables and their requirements for the installation of sensors in the launcher rocket present a serious problem for efficient energy transmission. In addition, the use of batteries for a wireless sensor network introduces maintenance issues for these batteries. Finally, the so-called energy harvesting methods with a thermocouple element or a piezoelectric element also present problems, in particular with regard to the identification of suitable sites and the correct placement of the elements in closed spaces.

SUMMARY OF THE INVENTION

The first object of the invention is to design a method of the above-mentioned type such that it exploits the properties of the available surface materials of the enclosed space, and in particular that it can be used for space missions. In a further object, the invention is designed to provide a device for carrying out said method.

The invention achieves the first object by providing a method in which at least a part of the light energy emitted by the light source is reflected at a reflective surface inside the space, and is then received in the at least one solar cell module and converted into electrical energy.

The solution of the additional object is achieved according to the invention by the fact that in an arrangement at least a portion of the space comprises a reflective inner surface comprising a multilayer insulation surface, at which the light energy emitted by at least one light source can be reflected.

The advantages of such an arrangement are due firstly to the fact that the light source or multiple light sources in the interior of the space can be placed in a flexible manner, and in addition that the distribution of the light can be optimized by means of the reflective surface, and also that the placement of the solar cell module is relatively non-critical to a successful application of the method according to the invention.

In another configuration of the invention, in particular, multiple light sources can be provided. Multiple reflective surfaces having different composition can also be provided. Finally, it is advantageous if multiple solar cell modules of different composition are also provided. The light source or sources can be switched on and off as required, and they can also be operated with both coherent and incoherent light in the visible and in the invisible range, i.e., in the range of infrared and ultraviolet light.

BRIEF DESCRIPTION OF THE DRAWINGS

In the following the invention will be explained in more detail based on an exemplary embodiment shown in the drawing, showing a light source and a reflective surface in a perspective view.

DETAILED DESCRIPTION OF THE PREFERRED EMBODIMENTS

The FIGURE shows a device for the wireless transmission of energy using reflections at multilayer insulation or MLI surfaces for a wireless sensor network used in space missions. A light source 2 is located in a closed space, the walls 1 of which are lined with MLI surfaces. A solar cell module 3 receives the light either directly or by reflections at the MLI-surfaces.

The invention claimed is:
1. A device for wirelessly transmitting, in a closed space, the energy emitted by at least one light source which is switchable on/off, the device configured for use in a space mission and comprising:
   the at least one light source being switchable on/off;
   at least one solar cell module arranged inside the closed space, and a multilayer insulation MLI surface providing a reflective inner surface of at least a portion of the space, at which surface the light energy emitted by the at least one light source is reflected, wherein the at least one solar cell is configured to receive the reflected light energy and to convert it into electricity.

2. The device according to claim 1, wherein said at least one light source comprises a plurality of light sources.

3. The device according to claim 2, wherein the light sources have different wavelengths.

4. The device according to claim 1, wherein said reflective inner surface comprises a plurality of differently reflecting surfaces.

5. The device according to claim 1, wherein said at least one solar cell module comprises a plurality of solar cell modules having different compositions.

* * * * *